Nov. 6, 1962     D. W. BOENSEL ETAL     3,062,442
PULSE DETECTOR APPARATUS
Filed April 17, 1961     3 Sheets-Sheet 1

DONALD W. BOENSEL
FREDERICK C. BRUGMA
INVENTORS

BY Allen E. Botney

ATTORNEY

Nov. 6, 1962    D. W. BOENSEL ETAL    3,062,442
PULSE DETECTOR APPARATUS
Filed April 17, 1961    3 Sheets-Sheet 3

DONALD W. BOENSEL
FREDERICK C. BRUGMA
INVENTORS

BY [signature]

ATTORNEY

# United States Patent Office 3,062,442
Patented Nov. 6, 1962

3,062,442
PULSE DETECTOR APPARATUS
Donald W. Boensel, La Crescenta, and Frederick C. Brugma, Los Angeles, Calif., assignors to Space-General Corporation, Glendale, Calif., a corporation of California
Filed Apr. 17, 1961, Ser. No. 103,273
20 Claims. (Cl. 235—92)

The present invention relates in general to peak voltage detection apparatus and more particularly to apparatus of the type mentioned that is capable of detecting which pulse in a sequence has the peak amplitude and of determining the relative position of that pulse in the sequence.

The electronics art has progressed to the point where it is now frequently necessary to determine which pulse in a serial sequence of randomly or systematically spaced pulses has the greatest amplitude, to identify the pulse position number of this pulse counting either from the beginning or end of the sequence, and to produce the number of this pulse on command at the end of or any time after completion of said sequence. In other words, it is oftentimes necessary today to inspect each pulse in a sequence of successively received pulses and to identify at the end of the sequence interval the pulse that had the greatest amplitude. Networks of this kind are colloquially referred to as "Greatest-Of" detectors and are classified according to whether they inspect several voltages simultaneously or sequentially. The former are known as Parallel Greatest-Of Detectors while the latter are called Serial Greatest-Of Detectors. It is obvious from what has been said that the invention to be described herein is of the latter group and, furthermore, it is believed that this invention is the first of its kind that performs all the above-stated functions, certainly the first of its kind that does so accurately and reliably and with a relatively simple or uncomplicated arrangement of apparatus.

In accordance with the basic concept of the present invention, a pulse count is started each time a pulse occurs that is thus far the greatest in amplitude and continues until a pulse of still greater amplitude occurs at which time the count is started once again, the final pulse count therefore identifying the position in the sequence of the pulse of greatest amplitude relative to the end of the sequence period, that is, the final count provides an indication of how many pulses back from the end of the pulse sequence period the pulse of greatest amplitude occurs. More particularly, the amplitude of each pulse in a sequence of pulses of different amplitudes is compared with a reference voltage level and when the amplitude of a pulse exceeds the reference voltage level, two events occur. First, the reference voltage is very rapidly increased until the two magnitudes are equal and second, a reset pulse is generated. The reference voltage remains at the new level until it is again exceeded, at which time it is once again rapidly increased to the new value and another reset pulse produced. At the same time that amplitude comparisons are made, the number of pulses received between successive reset pulses is counted. Consequently, if the total number of pulses in the sequence is unknown, the last count made is equal to the total number of pulses occurring in the interval between the pulse having the greatest amplitude and the end of the sequence. The position of the greatest amplitude pulse in terms of a countback from the end of the sequence is then available and can either be read out immediately or stored indefinitely and read out at any time upon command. In the event the total number of pulses in a given sequence is unknown and the position number of the greatest-amplitude pulse in terms of a count from the beginning of the sequence is desired, a count is also made of all the pulses in the sequence and from this count is subtracted the aforementioned count, namely, the count of the number of pulses occurring in the interval between the greatest-amplitude pulse and the end of the sequence.

According to one embodiment of the present invention, an incoming sequence of pulses is applied to a comparator network to which is also applied a reference voltage. The reference voltage is provided by a staircase-voltage generator which is rendered operable each time an incoming pulse exceeds the reference voltage level with which it is compared. During such operation, the reference voltage level is very rapidly increased until it attains the peak value of the aforesaid pulse, at which time the staircase-voltage generator is rendered inoperable until the reference voltage level is again exceeded. Thus, once the pulse of greatest amplitude has been received, the staircase generator will thereafter remain unchanging in its output and, therefore, the reference voltage level will remain fixed until the end of the sequence period, at which time the readout is effected and a new cycle of operation is begun. The sequence of pulses applied to the comparator is also applied to a counter circuit which, as its name implies, provides a count of the number of pulses applied to it since the counter was last reset to a zero-count condition. In addition to rendering the staircase-voltage generator operable to change the staircase-voltage output level each time the reference voltage level is exceeded, the comparator simultaneously resets the counter circuit, with the result that the counter ultimately provides a count of the number of pulses applied to it between successive resettings. Since the counter is also reset at the beginning of each sequence period, it will be obvious that the final pulse count provided by the counter represents the number of pulses received from the time the pulse of greatest amplitude occurred to the end of the sequence period. Thus, the final pulse count indicates the position of the greatest-amplitude pulse from the end of the sequence.

In a second embodiment of the present invention, the first embodiment is very slightly modified and additional components are added to it so as to provide a technique for determining the position of the greatest-amplitude pulse from the beginning of the sequence. Thus, this second embodiment further includes a second pulse counter circuit as well as a digital subtractor circuit, the output from both counter circuits now being connected to the digital subtractor. It will be remembered that the first pulse counter, that is, the resettable counter, provides a count of the number of pulses intervening between the end of the sequence period and the time of occurrence of the greatest-amplitude pulse. The second pulse counter, on the other hand, is arranged to be non-resettable during the sequence period, that is to say, this second pulse counter is reset only at the beginning of each sequence period so that its final pulse count at the end of the sequence reflects the total number of pulses occurring in the sequence. The outputs corresponding to the two pulse counts are subtracted one from the other in the digital subtractor circuit which thereby produces an output that indicates the position of the greatest-amplitude pulse from the beginning of the sequence.

The two embodiments described briefly above may be modified in a number of ways within the spirit and scope of the present invention. Thus, by way of example, a peak-detector circuit may be inserted before the comparator in each embodiment and, by so doing, the peak value of each received pulse is applied to the comparator for a longer period thereby making the rise-time requirements for the staircase waveform less stringent and also making it possible to examine with greater facility more sharply rising pulses.

It is a more specific object of the present invention to provide a circuit that is not only capable of determining which pulse in a sequence has the geatest amplitude but is also capable of determining the relative position of that pulse in the sequence.

It is a more specific object of the pesent invention to provide a circuit for determining the position of the pulse in a pulse sequence that has the greatest amplitude and for determining the position of that pulse relative to either the beginning or end of the pulse sequence.

Further objects of the present invention, the advantages thereof, and the novel features which are believed to be characteristic of the invention will be better understood from the following description considered in connection with the accompanying drawings in which several embodiments of the invention are illustrated by way of example. It is to be expressly understood, however, that the drawings are for the purpose of illustration and description only and are not intended as a definition of the limits of the invention.

Figure 1:
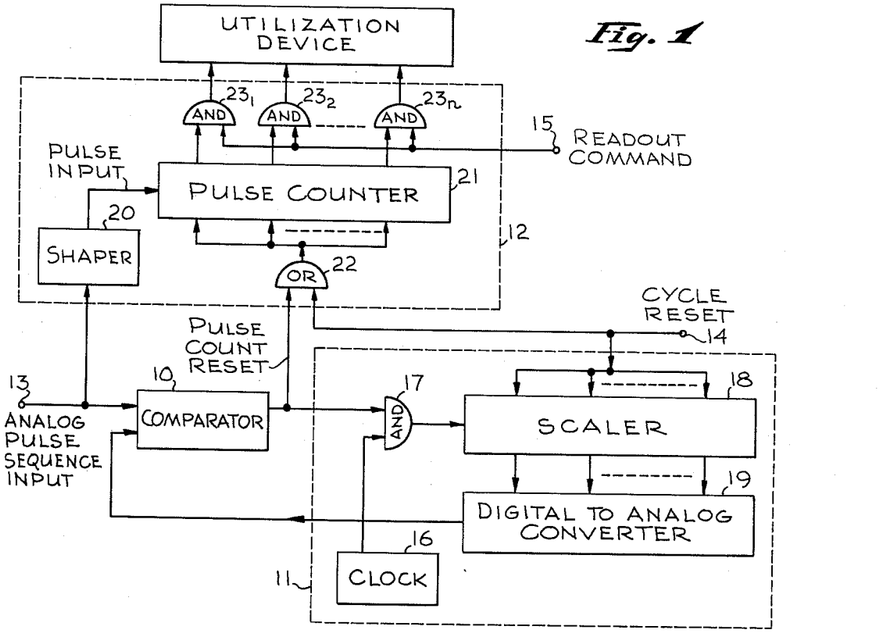
FIGURE 1 is a block diagram showing one embodiment of the present invention.

Referring now to the drawings and in particular to FIGURE 1 therein, the embodiment is shown to basically include a comparator circuit 10 to which two waveforms are applied, namely, a pulse sequence and a reference voltage, the function of the comparator being to compare the amplitude of one of these signals with that of the other and to produce an output signal when the reference voltage is exceeded by a pulse; a signal generator 11 capable, when activated, of producing a reference voltage that very rapidly increases from one level to another in a prescribed manner and which is also capable, when deactivated, of maintaining its last-attained voltage level until reset to some initial value; and a counter network 12 to provide a numerical count of the number of pulses applied to it during certain intervals of time. Comparator 10 has two inputs, one of them being connected to an input terminal 13 to which the pulse sequence is applied and the other of the two inputs, as well as the comparator output, being coupled to signal generator 11. The second comparator input receives the aforesaid reference voltage from the generator, while the signals that activate and deactivate the generator to produce the reference voltage are applied to it via the comparator output. Generator 11 may be any one of a number of different kinds but in the present instance it is a staircase-voltage generator which, when activated by a first signal out of the comparator, produces a voltage that rapidly increases in discrete steps and, when deactivated by a second signal out of the comparator, maintains the reference voltage at the level it attained at the time the deactivation signal occurred.

At the beginning of the pulse sequence interval, the generator is reset by means of a reset pulse applied to a cycle reset terminal 14 connected to the generator. Upon occurrence of a reset pulse, the reference voltage is returend to a zero level, with the reuslt that the generator is now ready for the next pulse sequence or cycle. With respect to pulse counter 12, it is also connected to input terminal 13 whereat it receives the pulses it is to count. Furthermore, counter 12 is resettable in nature and for that purpose is connected both to the output of comparator 10 and to reset terminal 14. More specifically, the counter is reset to read zero each time the comparator output produces an activation signal, with the result that the pulse count immediate prior to a resetting indicates the number of pulses received by the counter and, therefore, applied to input terminal 13, since the counter was previously reset. As will be explained in greater detail below, this fact plus the fact that the counter is also reset at the beginning of a pulse sequence period helps to identify the pulse in the sequence having the greatest amplitude and its relative position in the sequence. Finally, counter 12 is also connected to a readout-command terminal 15 to which pulses may selectively be applied in order to obtain a pulse count at the counter output when such information is desired.

Considering generator 11 and pulse counter 12 with greater particularity, the generator is shown to include a clock-pulse generator 16 which, as its name implies, generates clock pulses at a predetermined rate. Clock-pulse generator 16 is connected to one of two inputs to a clock gate 17 which may be either an Inhibit gate or an AND gate, preferably the latter in the present instance, the second input to the gate being connected to the output of comparator 10. Gate 17 is connected at its output end to a scaler 18 which may be a shift register, a resettable ring counter, or some other such mechanism, the several stages of the scaler being connected to a digital-to-analog converter 19 which, in turn, is coupled back to the second input of comparator 10. With respect to scaler 18 and converter 19, these elements are well known in the electronics art, such as, for example, in the computer or data processing fields and, hence, no further description as to the structural aspects of these elements is deemed necessary. However, it should be mentioned that the number of stages in scaler 18 corresponds to the maximum number of discrete steps to which the reference voltage would be subjected in going from its lowest voltage level to its highest voltage level. Thus, it will be recognized by those skilled in the art that if 32 discrete voltage steps are involved, then 5 scaler stages would be required. It should also be noted from the figure that each of these stages is connected in parallel to cycle reset terminal 14.

Pulse counter network 12 includes a shaper circuit 20 coupled between input terminal 13 and a resettable pulse counter circuit 21, the reset terminal of each stage in the counter circuit being connected in parallel to the output end of an OR gate 22 whose two input terminals are respectively connected to the output end of comparator 10 and to cycle reset terminal 14. Unit 12 also includes a plurality of AND gates equal in number to the number of counter stages, one AND gate for each such stage, the outputs from the various counter stages respectively being fed to the first of two input terminals to these AND gates. The AND gates are designated $23_1$–$23_n$ and their second input terminals are connected in parallel to readout command terminal 15, the outputs from these gates being fed to some utilization device, such as some device that will visually present the pulse count obtained.

Figure 2:
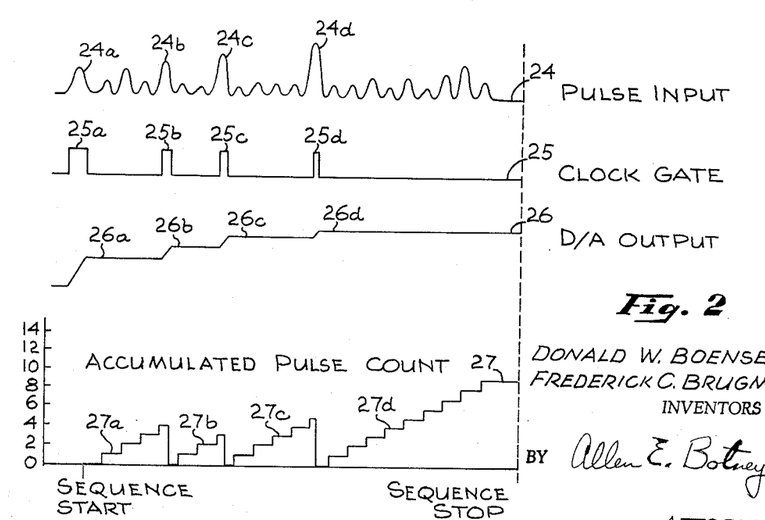
FIGURE 2 is a flow chart illustrating the type of voltage waveforms that may be developed at various points in the embodiment of FIGURE 1.

In considering the operation, reference will be made both to the circuitry of FIG. 1 and to the waveforms illustrated in FIG. 2. Assume now that a pulse sequence whose pulses are of different amplitudes, such as pulse sequence 24 in FIG. 2, are applied to input terminal 13 during a predetermined interval of time. Upon receipt of the first pulse, comparator 10 compares the amplitude of that pulse with that of the reference voltage out of digital-to-analog converter 19 which is simultaneously received by the comparator. Since the reference voltage is initially at a zero level, the amplitude of said first pulse will obviously exceed it, with the result that a pulse is initiated out of the comparator and applied to clock gate 17. The clock gate is normally in an Off condition by which is meant that it is normally in a condition that prevents the clock pulses generated by clock 16 from passing through to scaler 18. However, in response to the aforesaid pulse out of comparator 10, the clock gate is shifted to an On condition as a result of which the clock pulses are now permitted to pass through the gate for application to the scaler.

In consequence thereof, the stages in the scaler are successively activated to produce, in succession, groups or combinations of pulses at the various scaler outputs. These pulse combinations are applied to converter 19 wherein they are properly weighted and combined to form a rapidly increasing staircase voltage that has hereing been called the reference voltage. This staircase or reference voltage is then fed back to the comparator and when its voltage level is equal to or slightly exceeds the amplitude of the pulse also being applied to the comparator at this time, the pulse previously initiated at the output of the comparator and applied to gate 17 is terminated. When this occurs gate 17 reverts back to its Off condition to thereby prevent any further clock pulses from getting through to the scaler. At this point, the pulse combination presented at the output of scaler 18 remains fixed, with the corresponding result that the reference voltage also remains fixed at its last attained level which, it will be remembered, is approximately equal to the amplitude of the first pulse applied to input terminal 13. The pulse waveform out of comparator 10 is designated 25 in FIG. 2 whereas the reference voltage is designated 26. Thus, the first pulse produced by comparator 10 is designated 25a and its duration is equal to the time it took the reference voltage to rise to its first fixed level which is designated 26a. For sake of expediency and simplicity, the reference voltage has been shown in FIG. 2 to increase linearly although, as previously mentioned, it actually increases in a staircase fashion.

It will be seen from pulse sequence 24 that the next pulse to be applied to input terminal 13 whose amplitude exceeds that of pulse 24a is the pulse designated 24b and it will also be noted that three pulses of lesser amplitude are applied to the terminal in the interim between pulses 24a and 24b. With respect to the three pulses following pulse 24a, since the amplitude of these pulses is less than that of pulse 24a, their amplitudes are also less than the voltage level at which the reference voltage previously became fixed. Hence, the status quo is maintained, that is, no output pulse is produced by comparator 10 in response to any of these three pulses and the reference voltage level remains constant until the time of occurrence of pulse 24b. When pulse 24b is applied to input terminal 13, a comparison is again made in comparator 10 between the peak value of pulse 24b and reference voltage level 26a and since the peak value of the pulse is the greater of the two, a second pulse 25b is produced at this time at the output of the comparator. As before, gate 17 is turned On and clock pulses are once again applied to scaler 18, this time for the duration of pulse 25b. As may be expected, therefore, the reference voltage level is once again rapidly increased in successive steps until it is at least equal to substantially the peak value of pulse 24b at which time this particular cycle of operation is once again halted. The new reference voltage level is designated 26b in FIG. 2, the reference voltage remaining at this increased level until the next highest pulse in the sequence is received at input terminal 13, namely, pulse 24c.

The three pulses immediately following pulse 24a as well as pulse 24b are also applied to shaper circuit 20 wherein they are reshaped so as to be more sharply defined as pulses. The reshaped pulses, which have substantially the same duration as the original pulses but much faster rise times as a result of the reshaping, are applied in succession to pulse counter 21 which, in response thereto, applies a pulse pattern to AND gates $23_1$-$23_n$ that represents the total number of pulses received by the counter since the occurrence of pulse 24a. Thus, for example, in the present instance, the pulse pattern produced by counter 21 and applied to AND gates $23_1$-$23_n$ would represent the number "4." A pulse count waveform is shown in FIG. 2 and is designated 27 therein, the initial pulse count representation being designated 27a.

At the same time that comparator 10 applied pulse 25b to gate 17 in response to the application of pulse 24b, pulse 25b was also applied to OR gate 22 and through the OR gate to the reset terminals in the various stages of pulse counter 21. In consequence thereof, counter 21 is reset to a "0" count condition. It is thus seen that each pulse in the applied sequence that is greater in amplitude than any of the preceding pulses "clears" the counter and thereby makes it available to provide a count of the number of pulses received between that pulse and the next occurring pulse of still greater magnitude. Thus, for example, counter 21 would indicate the receipt of three pulses before it is reset by pulse 24c, the reset occurring after the counter has included pulse 24c in its count since the reshaped pulse out of shaper 20 corresponding to pulse 24c rises faster, as explained before, the pulse count produced by counter 21 between the occurrence of pulses 24b and 24c is represented by step function 27b in FIG. 2.

The cycles of operation delineated above recur until the pulse of greatest magnitude in the sequence is received at input terminal 13, at which time the cycle of operation that follows is altered slightly by the addition of two further events. In the pulse sequence selected, it is stipulated that pulse 24d is the pulse in the sequence having the greatest amplitude. Accordingly, as may be expected, when pulse 24d is received by comparator 10, a corresponding pulse, namely, pulse 25d, is produced at the output end of the comparator and simultaneously applied both to gate 17 and gate 22. Consequently, pulse counter 21 is once again reset to a "0" count state and, at the same time, clock pulses out of clock pulse generator 16 are once again applied to scaler 18. Once again, therefore, the reference voltage level out of converter 19 is rapidly increased to a new value, this time to the peak value of pulse 24d. This new reference voltage level is designated 26d in FIG. 2 and since pulse 24d has the greatest amplitude in the sequence, the reference voltage now remains at level 26d until the end of the sequence period. In other words, following the occurrence of pulse 24d, comparator 10 and generator 11 remain dormant until the end of the sequence period, only counter 12 functioning to provide a pulse count during this interval.

Thus, the pulses received at input terminal 13 after pulse 24d are applied to shaper 20 wherein, as previously mentioned, the sequence pulses are reformed and thereafter applied to pulse counter 21. Consequently, immediately prior to the end of the sequence period, the pulse pattern produced by the counter and applied to AND gates $23_1$ to $23_n$ corresponds to the total number of pulses applied to the counter during this specific period of time, namely, since the occurrence of pulse 24d. At this moment, a readout command signal is applied to terminal 15 by external circuitry (not shown) and, as a result, the counter output is passed through the AND gates to the utilization device which provides visual indication of the pulse count or a recording thereof. Furthermore, at the very outset of the sequence period, the external circuitry also applies a cycle reset pulse to terminal 14 and, in response to this pulse, all circuits in the detector are reset to their base operating state in preparation for the coming cycle of operation. More specifically, the cycle reset pulse causes pulse counter 21 to return to a "0" count. Similarly, with respect to scaler 18 so that the reference signal out of digital-to-analog converter 19 is also reduced to a "0" voltage level.

Referring once again to the utilization device, it will be obvious from what has been said that the pulse count indicated therein not only identifies the pulse in the sequence having the greatest amplitude but also determines the exact position of that pulse relative to the end of the sequence. In other words, it is now known how many pulses back from the end of the sequence period the pulse of maximum magnitude occurs.

In the event that the total number of pulses in the sequence are known, then it becomes a simple matter to determine the position in the sequence of the pulse of greatest amplitude relative to the beginning of the sequence and this may be done simply by subtracting the pulse count obtained above from the pulse count for the entire sequence. Where the exact number of pulses occurring during a sequence period is known beforehand, the step of subtraction can be done mentally. On the other hand, in the event the total number of pulses occurring during the sequence period is unknown beforehand but it is nevertheless desired to determine the position in the sequence of the pulse of maximum amplitude relative to the beginning of the sequence period, then the embodiment of FIG. 1 may be modified and extended in such a manner as to provide this additional information.

Figure 3:
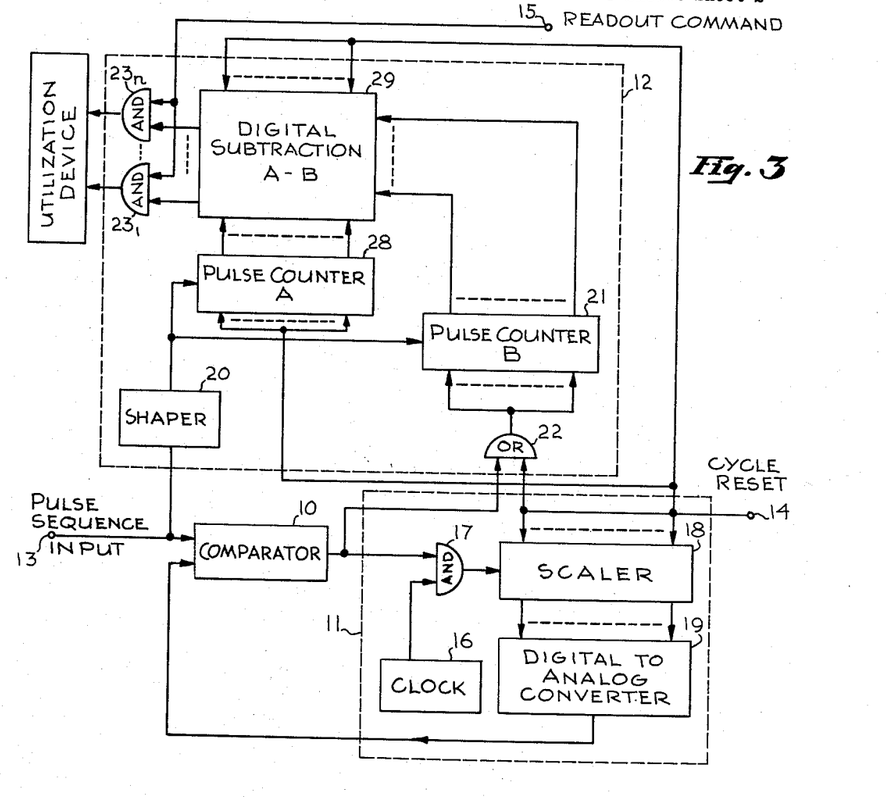
FIGURE 3 is a block diagram showing another embodiment of the present invention.

Accordingly, reference is made to FIG. 3 wherein an embodiment for this purpose is shown, the elements in the FIG. 3 embodiment that are identical with the elements in the FIG. 1 embodiment being similarly designated. As may be seen from a comparison, components 10 and 11 in the two embodiments are identical in every respect and having been previously described in connection with the FIG. 1 embodiment need not, therefore, be described again at this point. The differences between the two embodiments may be found, therefore, in the structural arrangement of component 12. Accordingly, reference is made to network 12 in FIG. 3 which is shown to include shaper 20, pulse counter 21 and OR gate 22 interconnected as before. However, network 12 further includes a second pulse counter 28 and a digital subtraction circuit 29, the output from shaper 20 being fed to pulse counter 28 just as it is to pulse counter 21, the output from both pulse counters being coupled to subtraction circuit 29. Digital subtraction circuit 29 is also connected to cycle reset terminal 14 in order to receive the pulse therefrom and also through AND gates ($23_1$–$23_n$) to the utilization device which, it may be recalled, is preferably a device that will provide a visual representation of the final output pulse count. With respect to digital subtraction circuit 29, such circuits are well known in the computer and data processing arts and, therefore, need not be described in great detail here. Suffice it to say, therefore, that circuit 29 is that type of circuit that is capable of producing an output signal that is equal to the difference between two other signals applied to it, the signals spoken of representing particular pulse counts. Finally, readout command terminal 15 is connected to AND gates $23_1$ to $23_n$, as shown in the figure, and cycle reset terminal 14 is also connected to pulse counter 28.

In considering the operation of the FIG. 3 embodiment, it should be mentioned at the outset that units 10 and 11 as well as the combination of elements 20, 21 and 22 in unit 12 function exactly as they did in the FIG. 1 embodiment. Accordingly, to avoid being redundant and, therefore, for sake of clarity and expediency, the operation of units 10 and 11 and elements 20, 21 and 22 in unit 12 will not be dealt with again here. It should be mentioned, however, by way of review, that pulse counter 21 produces a digital output that corresponds to the number of pulses from the end of the pulse sequence period to the pulse in the sequence having the maximum amplitude. As for pulse counter 28, since it is obviously reset only at the end of the sequence period, this pulse counter acts in response to the pulses out of shaper 20 to produce a digital output which, at the end of the sequence period, reflects a count of the total number of pulses that have occurred during said sequence period. This signal produced by counter 28 is also applied to digital subtraction circuit 29 wherein the signal out of counter 21 is linearly subtracted from the signal out of counter 28, the resultant signal reflecting this difference being applied by the subtracting circuit to AND gates $23_1$–$23_n$. As already mentioned, following the end of the sequence period the AND gates are subjected to a readout command pulse applied to terminal 15. Consequently, in response to this electrical command, AND gates $23_1$–$23_n$ operate to pass the digital signal then appearing at the output end of digital subtraction circuit 29. This signal is passed to the utilization device and, as heretofore mentioned, it corresponds to a count of the number of pulses from the beginning of the sequence period up to and including the pulse in the sequence having the greatest amplitude. This count from the beginning of the sequence period will, therefore, be visibly presented by the utilization device. It is thus seen that the position of the pulse of maximum amplitude may be determined relative to either the end or the beginning of a pulse sequence.

Referring once again to FIG. 2, it will be noticed therein that pulses 24 are of an analog nature, that is to say, pulses 24 are not very sharply defined but, rather, relatively speaking, rise gradually to a peak value, stay at that peak value for an instant, and then gradually taper off. In other words, pulses 24 require a finite period of time to reach their peak values and they stay at those values for only a moment. The reference voltage produced by digital-to-analog converter 19 also takes a finite period of time to rise to its final voltage level during each activation of unit 11. Accordingly, in the event the rise time of a received pulse is less than the rise time of the staircase waveform, it is possible that the reference voltage will reach its final voltage level only after the pulse has passed its peak value point. As a result, a very slight amount of error may occasionally be introduced which may have some significance where two or more pulses differ in amplitude by extremely slight amounts.

Figure 4:
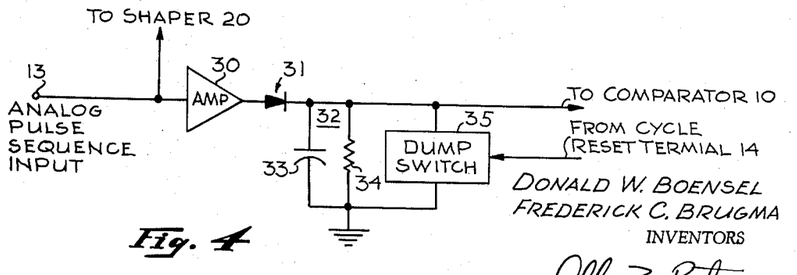
FIGURES 4, 5 and 6 are arrangements in block diagram form showing the manner in which the embodiments of FIGS. 1 and 3 may be modified to provide more effective operation at higher frequencies.

To eliminate this possibility or at the very least to substantially reduce such a possibility, the embodiments of FIGS. 1 and 3 may be modified by the insertion thereon of the arrangement shown in FIG. 4. As shown, the arrangement is inserted between input terminal 13 and comparator 10 and includes an amplifier 30 and a diode 31 connected in series between terminal 13 and comparator 10, the diode being connected between the amplifier and the comparator and being connected so as to be forward biased with respect to the polarity of the pulses received at terminal 13. Thus, in the present instance, the anode element of diode 31 is connected to the output of amplifier 30 whereas the cathode element of this diode is connected to the comparator. Connected between the cathode of diode 31 and ground is an integrating circuit 32 and a dump switch 35, the integrating circuit and the dump switch therefore being connected in parallel. Circuit 32 includes a capacitor 33 and a resistor 34 connected in parallel between the diode and ground, the capacitance of capacitor 33 and the resistance of resistor 34 being such that the circuit has a relatively long discharge time constant. As for drump switch 35, it is connected at its input and to cycle reset terminal 14 and operates each time a pulse is applied to that terminal to provide a very low impedance path across circuit 32.

In its operation, when a pulse is passed through diode 31 to capacitor 33, the voltage developed across the capacitor is at all times substantially equal to the instantaneous voltage of the pulse during the rise of that pulse to its peak value. Thus, the voltage across capacitor 33 is at its maximum value at substantially the same instant that the pulse to which the capacitor is being responsive is at its maximum value. Thereafter, however, because of the long discharge time constant for circuit 32, the voltage on the anode side of diode 31 decreases much more rapidly than the voltage on the cathode side of the diode, with the result that the voltage across capacitor 33 and, therefore, the voltage applied to comparator 10 during the latter portion of the pulse interval remains at substantially peak value. As a consequence, the reference voltage applied to the comparator has more of an opportunity to rise to the actual peak value of the pulse. In this way, the accuracy of the entire system is somewhat improved. At the end of a pulse sequence period, a cycle reset pulse is applied to dump switch 35 which is activated thereby to completely discharge capacitor 33 by shorting it to ground. The FIG. 4 apparatus is now ready for the next pulse sequence.

It will be recognized by anyone skilled in the art that the discharge time constant for capacitor 33 may be increased to a maximum by taking resistor 34 completely out of the circuit. By so doing, the voltage developed across capacitor 33 will not decrease at all but, rather, will remain at susbtantially the peak values of the received pulses for the periods of time involved.

In describing the operation of the FIG. 1 embodiment, it was mentioned that the count obtained upon readout was equal to the number of pulses occurrring between the end of the sequence period and the pulse in the sequence having the maximum amplitude. It should be obvious from the fact that the counter is reset by the pulse of maximum amplitude that this maximum pulse is not included in the count unless a "one" is added to the count. Several ways are available to correct this fixed error other than by adding a "one" to the count. Thus, for example, the counter can be adapted to be reset to a "1" state rather than to a "0" state. Again, the error may easily be avoided by modifying the embodiment of FIG. 1 in the manner shown in FIG. 5, to which reference is now made.

Figures 5, 7:
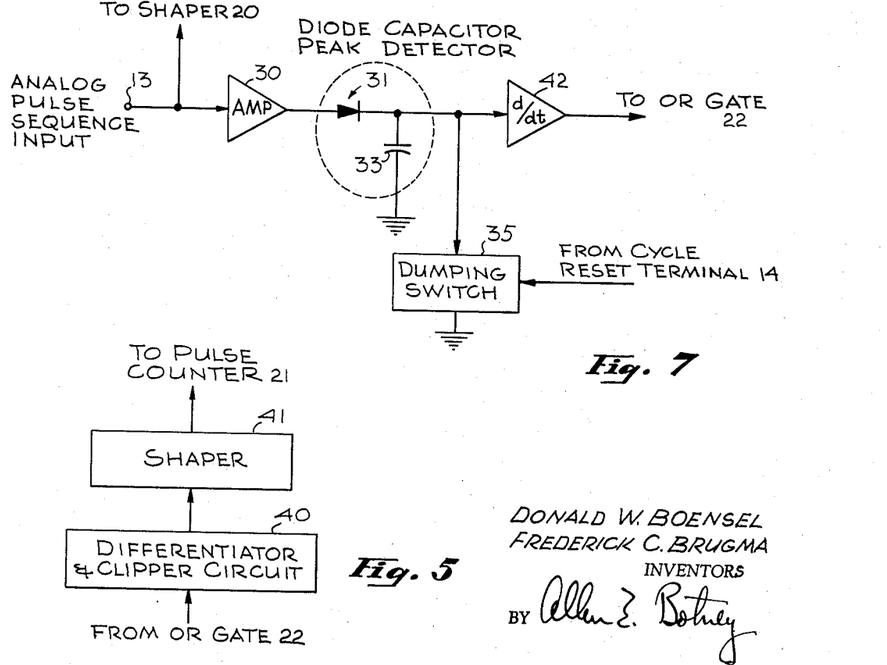
FIGURE 7 is a peak-detector circuit, shown partly in block form and partly in schematic form, that may be substituted for a portion of the embodiments in FIGS. 1 and 3 to provide still another embodiment of the invention.

The modification involves a differentiator and clipper circuit 40 and a shaper circuit 41 connected in series between OR gate 22 and the input to pulse counter 21, the shaper being coupled to the pulse counter and the differentiator and clipper circuit, on the other hand, being coupled to the OR gate. In its operation, a pulse out of comparator 10 and passed through gate 22 is applied to circuit 40 wherein it is differentiated to produce positive and negative voltage spikes coinciding in time with the leading and lagging edges respecively of the comparator output pulse. The clipper portion of circuit 40 then passes only the latter voltage spike to shaper 41 which, in response thereto, produces a rectangular pulse whose leading edge therefore coincides in time with the lagging edge of the pulse out of the comparator. This pulse produced by shaper 41 is then applied to pulse counter 21 which counts it. It will thus be obvious that in this way pulse counter 21 will first be reset by a pulse of maximum amplitude but will thereafter count it, thereby making it possible to obtain a final output count that will include the pulse of maximum amplitude.

Referring once again to basic component 11 in FIGS. 1 and 3, it will be remembered that scaler 18 therein consists of a number of stages, such as flip-flop circuits, connected in tandem, and that these stages are successively operated by the clock pulses applied to its through gate 17. Accordingly, time delays inherent in each stage are cumulative and become significant when efficient operation at higher frequencies is desired. To avoid these delays and the deleterious effects produced by them, component 11 may be modified and rearranged in the manner shown in FIG. 6.

Figure 6:
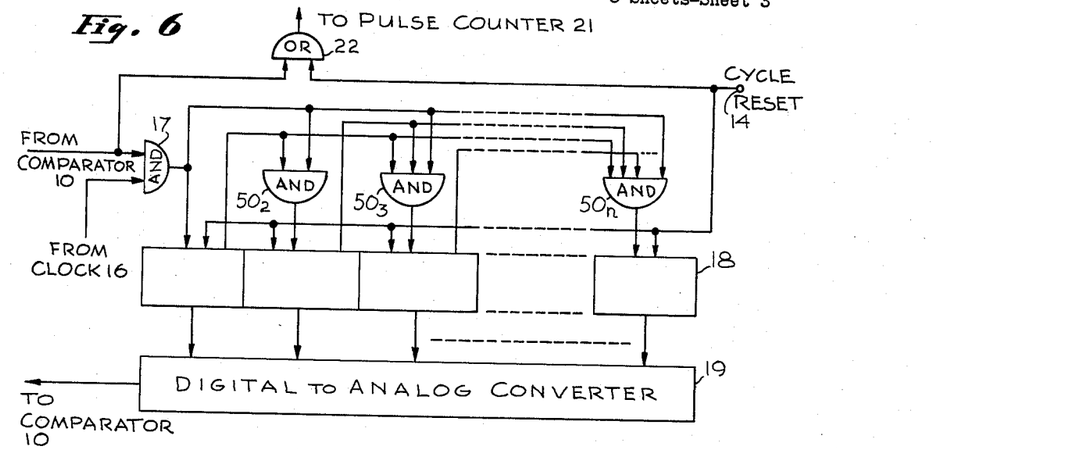

As shown, a plurality of $n-1$ AND gates, designated $50_2-50_n$, have been added, $n$ being equal to the number of stages in scaler 18. The output terminals from the $n-1$ AND gates are respectively connected to the last $n-1$ stages of scaler 18, that is to say, the output terminal from AND gate $50_2$ is connected to the second scaler stage, the output terminal from AND gate $50_3$ is connected to the third scaler stage, and so on, the output terminal from AND gate $50_n$ being connected to the $n$th and last stage in the scaler. With respect to the number of inputs to the various AND gates in the series, the number of inputs varies, the number of input terminals to each AND gate being equal to the position number of the associated scaler stage. More specifically, AND gate $50_2$ has two input terminals, AND gate $50_3$ has three input terminals, and so on, with AND gate $50_n$ having $n$ input terminals. One input terminal to each of the AND gates is connected to the output of AND gate 17, whose output is also connected to the first stage in scaler 18. As for the remaining input terminals, each AND gate is connected to receive the output from every scaler stage preceding the stage with which that gate is associated. Thus, for example, gate $50_2$ is also connected to receive the output from the first scaler stage, AND gate $50_3$ is connected to the output ends of the first and second scaler stages, and so on, AND gate $50_n$ being connected to receive the outputs from the first $n-1$ scaler stages. This, of course, accounts for the differing number of input terminals to the different AND gates. The other elements in unit 11 and their interconnections are as they were before. Thus, for reset purposes, cycle reset terminal 14 is connected to every stage in scaler 18 and is additionally connected to OR gate 22 to which comparator 10 is also connected. Finally, the output ends of the several stages in scale 18 are parallelly connected to digital-to-analog converter 19, the output from the converter being fed back to the comparator as previously described.

In operation, when AND gate 17 is activated by comparator 10 to pass clock pulses to scaler 18, each clock pulse is not only applied to the first scaler stage but, at the same time, is applied to each and every one of AND gates $50_2-50_n$. Furthermore, the output pulse produced by each scaler stage is applied to all the AND gates connected to succeeding scaler stages. Since the clock pulses and the output pulses from the various scaler stages are applied to the AND gates simultaneously, and AND gate is activated to apply a pulse to the scaler stage to which it is connected when that AND gate receives such signals at all its input terminals. Stated differently, because the clock pulses and the pulses out of the scaler stages are concurrently produced, AND gates $50_2$ to $50_n$ and, therefore, the scaler stages, will be operated in parallel rather than in tandem. For example, the first-occurring clock pulse only activates the first scaler stage. However, the second-occurring clock pulse not only activates the first scaler stage but also causes the second scaler stage to be operated at the same time, this being so because the second-occurring clock pulse and the pulse produced by the first scaler stage in response to the second-occurring clock pulse are both simultaneously applied to AND gate $50_2$ which is thereby activated to apply a pulse to the second scaler stage. It is thus seen that the first two scaler stages are simultaneously triggered. Similarly in response to further clock pulses, the remaining scaler stages are brought into operation, all stages, for the reasons explained, being operated simultaneously. It is quite apparent, therefore, that the delay times normally encountered, as mentioned above, is substantially eliminated as a problem. Hence, the arrangement of FIG. 6 is especially well suited for high speed or high-frequency operation.

In the event a less-exacting system is permissible, a simplified version of the system may be provided. Accordingly, reference is made to FIG. 7 wherein an arrangement of apparatus is shown that may be substituted for comparator 10 and unit 11 in either of the embodiments in FIGS. 1 and 3. The FIG. 7 apparatus is somewhat similar to that shown in FIG. 4 and includes amplifier 30, diode 31 and a differentiating circuit 42 connected in series between input terminal 13 and OR gate 22, the amplifier being connected to terminal 13, the differentiating circuit being connected to OR gate 22 and the diode being connected between the two, with its anode connected to the amplifier and its cathode connected to the differentiating circuit. The apparatus also includes a capacitor 33 and a dump switch 35 connected in parallel between the cathode element of diode 31 and ground. Finally, input terminal 13 is also coupled to shaper 20 and cycle reset terminal 14 is coupled to the input end of dump switch 35.

In considering the operation of the apparatus in FIG. 7 as it is combined with the apparatus of unit 12 in FIG. 1 (or unit 12 in FIG. 3), it will be assumed that pulse sequence 24 in FIG. 2 is applied to input terminal 13. Accordingly, the first pulse in the sequence, namely, pulse 24a, is amplified and passed through diode 31 to both capacitor 33 and differentiating circuit 42. The latter circuit differentiates the pulse applied thereto to produce a voltage spike that is passed through OR gate 22 to pulse counter 21 which is thereby reset. Prior to this occurrence, however, pulse 24a is counted by pulse counter 21. Returning to capacitor 33, pulse 24a is developed across this capacitor until the peak value of the pulse is reached. At this point, the pulse begins its decline but, due to the fact that there is no discharge path for the capacitor, the voltage across capacitor 33 remains at the attained peak voltage level. Thus, even after pulse 24a has occurred, the voltage across capacitor 33 remains at the peak value of that pulse. As a result, diode 31 is back-biased by this voltage and remains back-biased to this extent until a pulse of greater magnitude occurs, such as pulse 24b. Thus, in response to the application of pulse 24b to input terminal 13, pulse counter 21 is once again reset and the voltage appearing across capacitor 33 and, therefore, the voltage back-biasing diode 31, is increased from the peak value of pulse 24a to the peak value of pulse 24b. Of course, until pulse counter 21 is reset by pulse 24b, all pulses applied to the pulse counter in the interim between pulses 24a and 24b, including pulse 24b, are counted by that apparatus.

The cycles of operation delineated immediately above continue until pulse 24d is received. It will be recognized that since pulse 24d is the pulse of greatest amplitude in the sequence, diode 31 will be maximumly back-biased so that no further pulses will be passed therethrough until the end of the pulse sequence interval. It follows, therefore, that pulse counter 21 will not be reset again until the end of the pulse sequence interval so that a pulse count of the pulses occurring in the interim between pulse 24d and the end of the pulse sequence period is in the pulse counter at the end of said period. As before, this pulse count is read out immediately prior to the end of the pulse sequence period so that the pulse of maximum amplitude and its relative position in the pulse sequence is determined. At the end of the pulse sequence period, the pulse counter is reset once again by means of a cycle reset pulse applied to terminal 14, this very same pulse also activating dump switch 35 for the purpose of completely discharging capacitor 33. Consequently, the entire detector apparatus is now ready for the next complete cycle of operation, that is, the next following pulse sequence period.

While a few variations have been shown and pointed out in the discussion herein, it will be understood that the invention is not so limited but is generic to a wider range of circuits involving pulse amplitude detection. Accordingly, the invention should be considered to include any and all modifications, alterations or equivalent arrangements falling within the scope of the annexed claims.

Having thus described the invention, what is is claimed is:

1. A system for detecting which pulse in a sequence of pulses applied to the system has the maximum amplitude and for determining the relative position of that pulse in the sequence, said system comprising: a resettable network for counting the number of pulses applied thereto since being last reset, said network being receptive of the pulse sequence; means for resetting said network each time the amplitude of a pulse in the sequence exceeds a bias voltage applied to said means; and a circuit arrangement for producing a voltage equal in magnitude to the peak value of the pulse having the maximum amplitude among the pulses in the sequence thus far applied to the system, said circuit arrangement applying said voltage to said means as a bias voltage, whereby a count is obtained of the number of pulses between the end of the sequence and the pulse in the sequence having the maximum amplitude.

2. A system for detecting which pulse in a sequence of pulses applied to the system has the maximum amplitude and for determining the relative position of that pulse in the sequence, said system comprising: a resettable network for counting the number of pulses applied thereto since being last reset, said network being receptive of the pulse sequence; and means receptive of the pulse sequence, said means being adapted to reset said network each time the amplitude of a pulse in the sequence exceeds the amplitude of a previously occurring pulse, whereby a count is obtained of the number of pulses between the end of the sequence and the pulse in the sequence having the maximum amplitude.

3. The system defined in claim 2 wherein said means includes a diode connected to be forward-biased with respect to the polarity of the pulses in the sequence, said diode being connected to receive the pulse sequence at its input end; a capacitor connected between ground and the output end of said diode for back-biasing said diode to a voltage level equal to the peak value of the pulse having the maximum amplitude among the pulses in the sequences thus far received by the diode; a circuit coupled between the output end of said diode and said network for resetting the network each time the amplitude of a pulse exceeds the back-biasing voltage produced by said capacitor; and means for discharging said capacitor following the pulse sequence.

4. The system defined in claim 2 wherein said means includes a diode connected to be foreward-biased with respect to the polarity of the pulses in the sequence, said diode being connected to receive the pulse sequence at its input end; a capacitor connected between ground and the output end of said diode for back-biasing said diode to a voltage level equal to the peak value of the pulse having the maximum amplitude among the pulses in the sequence thus far received by the diode; a comparator network coupled to the output end of said diode and operable to produce a reset pulse for resetting said network whenever and for as long as the voltage across said capacitor exceeds a reference voltage applied thereto; apparatus coupled to said comparator network to receive each reset pulse therefrom and to apply said reference voltage thereto, said apparatus being operable in response to a reset pulse to rapidly increase the value of said reference voltage until it is at least equal to the voltage across said capacitor; and means for discharging said capacitor following the pulse sequence.

5. The system defined in claim 3 wherein said circuit is a differentiating circuit operable to produce a voltage spike each time the amplitude of a pulse exceeds the back-biasing voltage produced by said capacitor.

6. The system defined in claim 2 wherein said means includes a comparator network receptive of the pulse sequence and operable to produce a reset pulse for resetting said network whenever and for as long as the amplitude of a received pulse exceeds a reference voltage applied thereto; and apparatus coupled to said comparator network to receive each reset pulse therefrom and to apply said reference voltage thereto, said apparatus being operable in response to a reset pulse to rapidly increase the value of said reference voltage until it is at least equal to the amplitude of the pulse applied to said means and in response to which said reset pulse was produced.

7. The system defined in claim 6 wherein said apparatus includes a generator for generating clock pulses; an AND gate coupled to said generator and to said comparator network for passing those of said clock pulses that are generated during the occurrence of a reset pulse; and a device coupled between said AND gate and said comparator network, said device being operable in response to the passed clock pulses to respectively increase the value of said reference voltage in discrete steps.

8. The system defined in claim 2 wherein said resettable network includes a device for reshaping the pulses in the received pulse sequence to produce a corresponding pulse sequence having more sharply defined rectangular pulses; a pulse counter having a plurality of bistable stages connected in tandem and arranged to provide a count of the number of pulses applied to the input stage thereof, said input stage being connected to said device; an OR gate intercoupling said means and all the stages of said pulse counter; and a plurality of AND gates respectively connected to the plurality of bistable stages, said AND gates being operable in response to a command to read out the pulse count.

9. A system for detecting which pulse in a sequence of pulses applied to the system has the maximum amplitude and for determining the relative position of that pulse in the sequence, said system comprising: a device receptive of the pulse sequence and adapted to reshape the pulses thereof to produce a corresponding pulse sequence having more sharply defined rectangular pulses; a pulse counter having a plurality of bistable stages connected in tandem and arranged to provide a count of the number of pulses applied to the input stage thereof, said input stage being connected to said device; an OR gate intercoupling said means and all the stages of said pulse counter; a plurality of AND gates respectively connected to the plurality of bistable stages, said AND gates being operable in response to a command to read out the pulse count; a diode connected to be forward-biased with respect to the polarity of the pulses in the sequence, said diode being connected to receive the pulse sequence at its input end; a capacitor connected between ground and the output end of said diode for back-biasing said diode to a voltage level equal to the peak value of the pulse having the maximum amplitude among the pulses in the sequence thus far received by the diode; a circuit coupled between the output end of said diode and said OR gate to produce a reset pulse each time the amplitude of a pulse in the sequence exceeds the back-biasing voltage produced by said capacitor; and means for discharging said capacitor following the pulse sequence.

10. A system for detecting which pulse in a sequence of pulses applied to the system has the maximum amplitude and for determining the relative position of that pulse in the sequence, said system comprising: a device receptive of the pulse sequence and adapted to reshape the pulses thereof to produce a corresponding pulse sequence having more sharply defined rectangular pulses; a pulse counter having a plurality of bistable stages connected in tandem and arranged to provide a count of the number of pulses applied to the input stage thereof, said input stage being connected to said device; an OR gate intercoupling said means and all stages of said pulse counter; a plurality of AND gates respectively connected to the plurality of bistable stages, said AND gates being operable in response to a command to read out the pulse count; a comparator network coupled to said OR gate and receptive of the pulse sequence, said comparator network being operable to apply a reset pulse to said OR gate for resetting said pulse counter whenever and for as long as the amplitude of a received pulse exceeds a reference voltage applied thereto; and apparatus coupled to said comparator network to receive each reset pulse therefrom and to apply said reference voltage thereto, said apparatus being operable in response to a reset pulse to rapidly increase the value of said reference voltage until it is at least equal to the amplitude of the pulse applied to said comparator network and in response to which said reset pulse was produced.

11. The system defined in claim 10 wherein said apparatus includes a generator for generating clock pulses; an AND gate coupled to said generator and to said comparator network for passing those of said clock pulses that are generated during the occurrence of a reset pulse; and a reference voltage source coupled between said AND gate and said comparator network, said source being operable in response to the passed clock pulses to respectively increase the value of said reference voltage in discrete steps until said voltage is at least equal to the amplitude of the pulse applied to said comparator network and in response to which said reset pulse was produced.

12. A system for detecting which pulse in a sequence of pulses applied to the system has the maximum amplitude and for determining the relative position of that pulse in the sequence, said system comprising: a first resettable network for counting the number of pulses applied thereto since being last reset, said network being receptive of the pulse sequence; means receptive of the pulse sequence, said means being adapted to reset said network each time the amplitude of a pulse in the sequence exceeds the amplitudes of previously occurring pulses, whereby a count is obtained of the number of pulses between the end of the sequence and the pulse in the sequence having the maximum amplitude; a second resettable network for counting the number of pulses in the pulse sequence; and equipment for subtracting the pulse count provided by said first network from the pulse count provided by said second network to provide an output count of the number of pulses between the beginning of the sequence and the pulse in the sequence having the maximum amplitude.

13. A system for detecting which pulse in a sequence of pulses applied to the system has the maximum amplitude and for determining the relative position of that pulse in the sequence, said system comprising: a first resettable network for counting the number of pulses applied thereto since being last reset; means for resetting said first network each time the amplitude of a pulse in the sequence exceeds a bias voltage applied to said means; a circuit arrangement for producing a voltage equal in magnitude to the peak value of the pulse having the maximum amplitude among the pulses in the sequence thus far applied to the system, said circuit arrangement applying said voltage to said means as a bias voltage, whereby a count is provided by said first network of the number of pulses between the end of the sequence and the pulse in the sequence having the maximum amplitude; a second resettable network for counting the total number of pulses in the pulse sequence; and equipment for subtracting the pulse count provided by said first network from the pulse count provided by said second network to provide an output count of the number of pulses between the beginning of the sequence and the pulse in the sequence having the maximum amplitude.

14. The system defined in claim 13 wherein said means includes a diode connected to be forward-biased with respect to the polarity of the pulses in the sequence, said diode being connected to receive the pulse sequence at its input end; a capacitor connected between ground and the output end of said diode for back-biasing said diode to a voltage level equal to the peak value of the pulse having the maximum amplitude among the pulses in the sequence thus far received by the diode; apparatus connected across said capacitor for selectively discharging said capacitor; and a comparator network coupled between the output end of said diode and said first network for resetting the network each time a pulse is passed through said diode.

15. A system for detecting which pulse in a sequence of pulses applied to the system has the maximum amplitude and for determining the relative position of that pulse in the sequence, said system comprising: a first resettable network for counting the number of pulses applied thereto since being last reset, said first network being connected to receive the pulse sequence; a comparator network receptive of the pulse sequence and operable to produce a reset pulse for resetting said first network whenever and for as long as the amplitude of a received pulse exceeds a reference voltage applied thereto; means for generating clock pulses; an AND gate coupled to said means and to said comparator network for passing those of said clock pulses that are generated during the occurrence of a reset pulse; a reference voltage source coupled between said AND gate and said comparator network, said source being operable in response to the passed clock pulses to respectively increase the value of said reference voltage in discrete steps until it is at least equal to the amplitude of the pulse applied to said comparator network and in response to which said reset pulse was produced, whereby said first resettable network provides a count of the number of pulses between the end of the sequence and the pulse in the sequence having the maximum amplitude; a second resettable network for counting the total number of pulses in the pulse sequence; and equipment for subtracting the pulse count provided by said first network from the pulse count provided by said second network to provide an output count of the number of pulses between the beginning of the sequence and the pulse in the sequence having the maximum amplitude.

16. A system for detecting which pulse in a sequence of pulses applied to the system has the maximum amplitude and for determining the relative position of that pulse in the sequence, said system comprising: a device for reshaping the pulses in the received pulse sequence to produce a corresponding pulse sequence having more sharply defined rectangular pulses; a first pulse counter having a first plurality of bistable stages connected in tandem and arranged to provide a count of the number of pulses applied to the input stage thereof since being last reset, said input stage being connected to said device; a comparator network receptive of the received pulse sequence and operable to produce a reset pulse whenever the amplitude of a received pulse exceeds a reference voltage applied thereto; means for generating clock pulses; an AND gate coupled to said means and to said comparator network for passing those of said clock pulses that are generated during the occurrence of a reset pulse; a reference voltage source coupled between said AND gate and said comparator network, said source being operable in response to the passed clock pulses to respectively increase the value of said reference voltage in discrete steps until it is at least equal to the amplitude of the pulse applied to said comparator network and in response to which said reset pulse was produced; an OR gate connected to apply each reset pulse out of said comparator network to all the stages of said first pulse counter, whereby said first pulse counter provides a final count of the number of pulses between the end of the sequence period and the pulse in the sequence having the maximum amplitude, said OR gate also being connected to receive a cycle reset pulse for resetting the stages of said first counter at the end of the sequence; a second pulse counter having a second plurality of bistable stages connected in tandem and arranged to provide a count of the total number of pulses applied to the input stage thereof during the pulse sequence, said input stage being connected to said device and all stages being connected to receive a cycle reset pulse for resetting all the stages of said second counter at the end of the sequence; and apparatus for subtracting the final pulse count provided by said first pulse counter from the total pulse count provided by said second pulse counter to provide an output count of the number of pulses between the beginning of the sequence and the pulse in the sequence having the maximum amplitude.

17. A system for detecting which pulse in a sequence of pulses applied to the system has the maximum amplitude and for determining the relative position of that pulse in the sequence, said system comprising: a pulse counter having a plurality of resettable bistable stages connected in tandem, said stages being operable in response to pulses applied to the input stage thereof to produce a digital signal at the output ends of said stages that is indicative of the number of pulses applied to said input stage since said stages were last reset; a circuit for reshaping the pulses in the received pulse sequence to produce a corresponding pulse sequence having more sharply defined rectangular pulses, said circuit being connected to the input stage of said pulse counter for applying the reshaped pulses thereto; a plurality of AND gates respectively connected to said plurality of bistable stages, said AND gates being operable in response to a command to read out said digital signal; a comparator network receptive of the received pulse sequence and operable to produce a reset pulse whenever the amplitude of a received pulse exceeds a reference voltage applied thereto; an OR gate connected to apply each reset pulse out of said comparator network to all the stages of said pulse counter, whereby said pulse counter produces a final digital signal that indicates the number of pulses between the end of the sequence and the pulse in the sequence having the maximum amplitude, said OR gate also being connected to receive a cycle reset pulse for resetting the stages of said pulse counter at the end of the sequence; and a reference voltage source coupled to said comparator network to receive each reset pulse therefrom and to apply said reference voltage thereto, said source being operable in response to a reset pulse to rapidly increase the value of said reference voltage until it is at least equal to the amplitude of the pulse applied to said comparator network and in response to which said reset pulse was produced.

18. The system defined in claim 17 wherein said reference voltage source includes means for generating clock pulses; an AND gate coupled to said means and to said comparator network for passing those of said clock pulses that are generated during the occurrence of a reset pulse; a plurality of $n$ resettable bistable stages connected to receive a cycle reset pulse for resetting said $n$ stages at the end of the sequence, one of said $n$ stages being connected to receive the clock pulses passed by said AND gate; a plurality of $n-1$ AND gates respectively connected at their output ends to the remaining $n-1$ bistable stages, each AND gate being connected at its input end to receive the clock pulses passed by said AND gate and also connected at its input end to receive the outputs from all preceding bistable stages; and a digital-to-analog converter connected between said $n$ bistable stages at the output ends thereof and said comparator network.

19. A system for detecting which pulse in a sequence of pulses applied to the system has the maximum amplitude and for determining the relative position of that pulse in the sequence, said system comprising: a resettable network for counting the number of pulses applied thereto since being last reset, said network being receptive of the pulse sequence; circuitry for producing a reset pulse to reset said network each time the amplitude of a pulse in the sequence exceeds a bias voltage applied to said circuitry; means coupled between said circuitry and said network, said means being operable in response to said reset pulse to apply another pulse to said network that is delayed in time with respect to said reset pulse, whereby said other pulse is counted by said network; and apparatus for producing a voltage equal in magnitude to the peak value of the pulse having the maximum amplitude among the pulses in the sequence thus far applied to the system, said apparatus applying said voltage to said circuitry as a bias voltage, whereby a count is obtained of the number of pulses between the end of the sequence period and the pulse in the sequence having the maximum amplitude.

20. The system defined in claim 19 wherein said means includes a differentiator circuit for differentiating said reset pulse to produce first and second voltage spikes coinciding in time with the leading and lagging edges, respectively, of said reset pulse; and a device operable in response to said second voltage spike to apply said other pulse to said network.

No references cited.